United States Patent
Darche et al.

(10) Patent No.: US 10,587,483 B1
(45) Date of Patent: *Mar. 10, 2020

(54) PACKET CAPTURE COLLECTION TASKING SYSTEM

(71) Applicant: AREA 1 SECURITY, INC., Menlo Park, CA (US)

(72) Inventors: Blake Darche, Finksburg, MD (US); Javier Castro, Silver Spring, MD (US); Chiraag Aval, Menlo Park, CA (US)

(73) Assignee: Area 1 Security, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,451

(22) Filed: Jul. 31, 2018

Related U.S. Application Data (63) Continuation of application No. 15/051,475, filed on Feb. 23, 2016, now Pat. No. 10,038,603.

(51) Int. Cl.
*H04L 12/26* (2006.01)

(52) U.S. Cl.
CPC .......... *H04L 43/028* (2013.01); *H04L 43/062* (2013.01)

(58) Field of Classification Search
CPC ............................ H04L 43/028; H04L 43/062
See application file for complete search history.

(56) References Cited

U.S. PATENT DOCUMENTS 6,006,328 A  12/1999  Drake
8,272,060 B2  9/2012  Milliken
(Continued)

OTHER PUBLICATIONS

Darche, U.S. Appl. No. 15/051,475, filed Feb. 23, 2016, Office Action, dated Jan. 26, 2018.

(Continued)

*Primary Examiner* — El Hadji M Sall
(74) *Attorney, Agent, or Firm* — Hickman Palermo Becker Bingham LLP; Malgorzata A. Kulczycka (57) ABSTRACT

A method and apparatus for packet capture is provided. A computer system comprises: a plurality of sensor computers each programmed to capture data packets directed to a different compromised computer from one or more attacker computers; a command server that is programmed to identify a first packet capture filter of a plurality of packet capture filters for a first sensor computer of the plurality of sensor computers, to transmit, via a communications network, the first packet capture filter to the first sensor computer of a plurality of sensor computers, wherein the first packet capture filter is programmed to cause the first sensor computer to capture a first set of data packets that have been routed toward a first compromised computer, and to identify a second packet capture filter of the plurality of packet capture filters for a second sensor computer of the plurality of sensor computers, to send, via the communications network, wherein the second packet capture filter is programmed to cause the second sensor computer to capture a second set of data packets that have been routed toward a second compromised computer, and to instruct the first sensor computer to capture data packets using the first packet capture filter and to instruct the second sensor computer to capture a second set of data packets using the second packet capture filter.

20 Claims, 5 Drawing Sheets

(56) References Cited

U.S. PATENT DOCUMENTS

| | | |
|---|---|---|
| 9,350,750 B1 | 5/2016 | Aval |
| 9,356,942 B1 | 5/2016 | Joffe |
| 2008/0244739 A1 | 10/2008 | Liu |
| 2011/0234815 A1* | 9/2011 | Zahnert .................. G06K 9/228 348/207.1 |
| 2013/0343390 A1 | 12/2013 | Moriarty |

OTHER PUBLICATIONS

Darche, U.S. Appl. No. 15/051,475, filed Feb. 23, 2016, Notice of Allowance, dated Jun. 5, 2018.
Castro, U.S. Appl. No. 15/638,158, filed Jun. 29, 2017, Notice of Allowance, dated Sep. 24, 2018.

* cited by examiner

PACKET CAPTURE COLLECTION TASKING SYSTEM

BENEFIT CLAIM

This application claims the benefit under 35 U.S.C. § 120 as a Continuation of application Ser. No. 15/051,475, filed Feb. 23, 2016, the entire contents of which is hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

FIELD OF THE DISCLOSURE

The present disclosure generally relates to computer security techniques applicable to computers that have been compromised with bots and other malware and relates more specifically to techniques for packet capture using a distributed network of sensor computers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer networking and security, a troublesome problem involves the installation, by attacker computers, of bots or other malicious software ("malware") on unsuspecting computers ("compromised computers") that are then employed by the attacker to carry out attacks on a third computer, often associated with a business, enterprise, or other institution. The mode of attack in which the attacker takes control of a compromised computer and uses it to initiate attacks on third computers can be difficult for security experts to fully detect because of problems in identifying the ultimate attacker.

Present techniques to address the foregoing problem domain generally have been found to be ineffective, slow, or incomplete, so that improved solutions are needed.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Example Network Topology
    3.0 Process Overview
    4.0 Implementation Mechanisms—Hardware Overview
    5.0 Other Aspects of Disclosure

1.0 GENERAL OVERVIEW

In an embodiment, a computer system is programmed to provide improved packet capture using a flexible automatic packet filter installation and configuration approach. The computer system comprises: a plurality of sensor computers each programmed to capture data packets directed to a different compromised computer from one or more attacker computers; a command server that is programmed to identify a first packet capture filter of a plurality of packet capture filters for a first sensor computer of the plurality of sensor computers, to transmit, via a communications network, the first packet capture filter to the first sensor computer of a plurality of sensor computers, wherein the first packet capture filter is programmed to cause the first sensor computer to capture a first set of data packets that have been routed toward a first compromised computer, and to identify a second packet capture filter of the plurality of packet capture filters for a second sensor computer of the plurality of sensor computers, to send, via the communications network, wherein the second packet capture filter is programmed to cause the second sensor computer to capture a second set of data packets that have been routed toward a second compromised computer, and to instruct the first sensor computer to capture data packets using the first packet capture filter and to instruct the second sensor computer to capture a second set of data packets using the second packet capture filter.

In an embodiment, a computer system for improved packet capture in a networked environment comprises: a sensor computer in electronic communication with a command server and coupled to a compromised computer, the sensor computer programmed to receive, via a communications network, a first packet capture filter transmitted to the sensor computer and an instruction to capture data packets using the first packet capture filter, and to capture, using a first packet capture filter received from the command server, a set of data packets communicated by a compromised computer coupled to the sensor computer that match the first packet capture filter, and to periodically upload the set of data packets to a data sink server.

The mode of attack in which the attacker takes control of a compromised computer and uses it to initiate attacks on third computers can be difficult for security experts to fully remediate because of problems in identifying the ultimate attacker. When the attacker computer is located behind a firewall, or owned and operated by a malicious state actor, it may be practically impossible to identify the true actor. Further, the owner or operator of the compromised computer may be unaware that the malware is present on the system or used to initiate attacks against others. However, the target of the attack—such as a business enterprise—often can determine that it is under attack, and often can trace the source of the attack to a compromised computer. With information about the location of compromised computers, the techniques described herein can be deployed to provide effective means to collect packets sent to the compromised computer that match a packet capture filter deployed on a sensor computer coupled to the compromised computer.

While each of the drawing figures illustrates a particular embodiment for purposes of illustrating a clear example, other embodiments may omit, add to, reorder, and/or modify any of the elements shown in the drawing figures.

2.0 EXAMPLE NETWORK ENVIRONMENT

Figure 1:
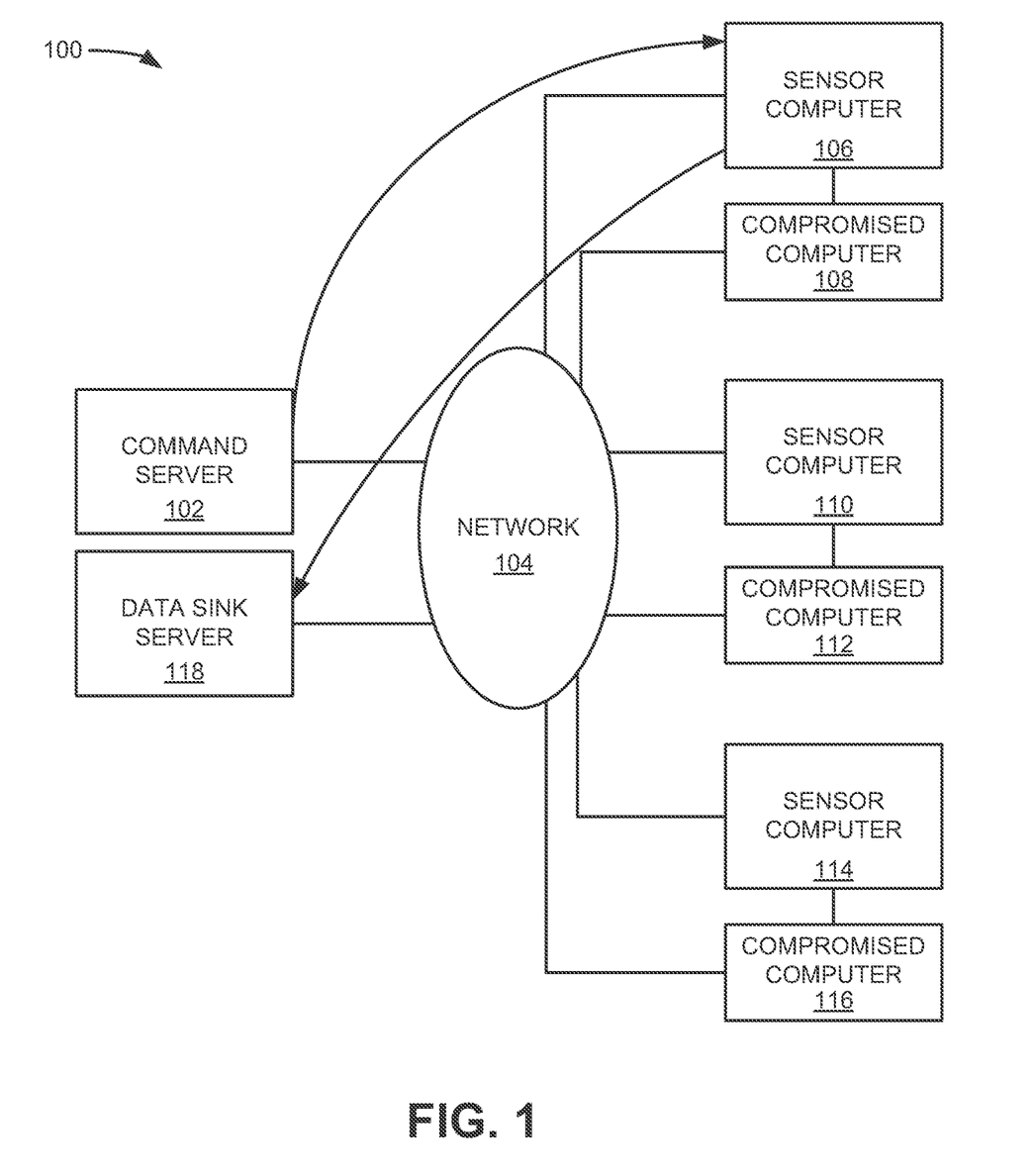
FIG. 1 illustrates a computer networking environment featuring a command server and one or more sensor computers located near compromised computers.
Figure 2:
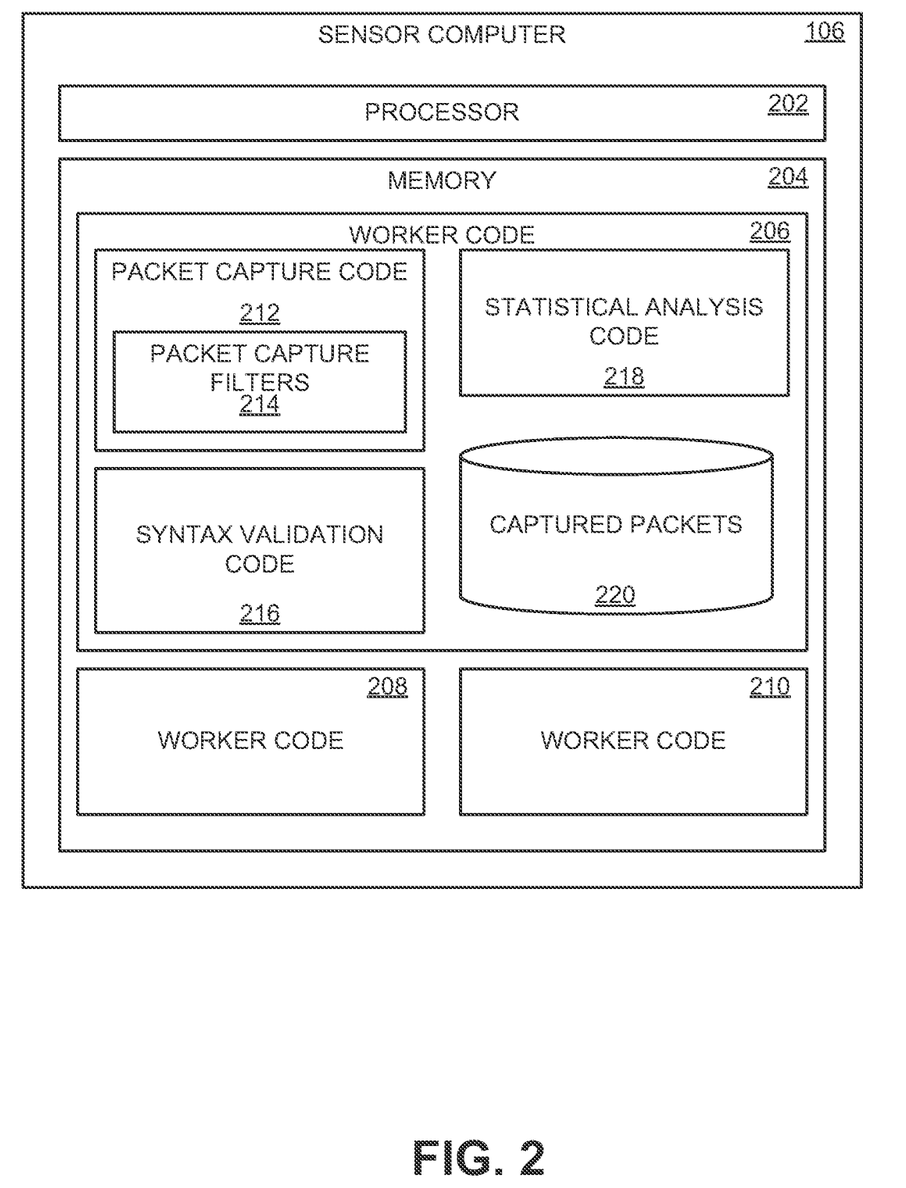
FIG. 2 illustrates an example of logical and functional elements of a sensor computer.

FIG. 1 illustrates a computer networking environment featuring a command server and one or more sensor computers located near compromised computers. FIG. 2 illustrates an example of logical and functional elements of a sensor computer.

Referring first to FIG. 1, in one embodiment, an example networked environment may have as principal elements a command server 102 coupled to a network 104, a plurality of sensor computers 106, 110, and 114, a plurality of compromised computers 108, 112, and 116, and a data sink server 118. FIG. 1 represents just one example of a possible networked environment in which embodiments may be used; the general approaches and algorithms disclosed herein may be applied in many other environments or network arrangements.

The command server 102 is configured or programmed to provide packet capture filters to each of the sensor computer 106, 110, and 114. The sensor computers 106, 110, and 114 are configured to access and evaluate data packets sent to or by a compromised computer. The sensor computers use the packet capture filters to evaluate the packets. In some embodiments, the command server 102 performs a syntax validation on the packet capture filters. The command server 102 receives a request for packet capture filters from a sensor computer 106 that identifies the sensor computer 106. The command server 102 responds to the request with an instruction to retrieve zero, one, or more data packets filters stored at the command server 102.

The command server 102 is further configured or programmed to generate and maintain records indicating, for each sensor computer, the packet capture filters that have been sent to or retrieved by the sensor computer. Each sensor computer may have a different set of packet capture filters for capturing packets. The command server 102 assigns each sensor computer a globally unique identifier (GUID) that is used by the sensor computer to self-identify when communicating with the command server 102. The command server 102 may store the GUID of a sensor computer in association with identifiers of packet capture filters that have been sent to the sensor computer identified by the GUID.

Further, the command server 102 may, for each sensor computer, instruct the sensor computer to turn on or off one or more of the packet capture filters stored thereon. The individual packet capture filters, when turned on, operate to collect data packets at the sensor computer that match one or more conditions included in the packet capture filter. When the individual packet capture filters are turned off, the sensor computer ceases collecting the data packets at the sensor computer using the packet capture filter.

The command server 102 may maintain a log tracking the activity of the sensor computers. The log may include an identifier of each packet capture filter sent to the individual sensor computer, a date and time indicating when the packet capture filters were sent to each sensor computer, and dates and times when each of the packet capture filters is turned on or off. The command server 102 may support an audit feature, using which, an administrator may access the log.

The command server 102 may further store configuration files describing each of the sensor computers. The configuration files may include information about the sensor computer and/or its associated compromised computer. The configuration for a sensor computer includes local host paths, a remote network address, and variables required to collect packets in a dynamic environment. In some instances, each sensor configuration includes data such as:

uuid: a unique identifier for the sensor to differentiate the sensor from other assets on our collection platform;

upload_dir: a directory to place a file to initiate file upload;

process_dir: an interim directory to place a file after packaging (compression) and prior to upload;

interface: a list of commas separated interfaces to perform packet capture;

pcap_dir: a directory to place ongoing packet dumps for the packet captures;

pcap_size: a designated size to begin packaging current pcap file and start a new pcap file;

server: A central server to receive network filters for pcap collection, send health status of the packet collection tool, and to upload packet capture statistics.

update_timeout (optional): Interval of time to check for new network filters and update the packet capture tools health and packet capture stats.

upload_timeout (optional): Interval of time to check for processed pcap files to upload to the data sink An example of such a configuration is below:
Sensor configuration variables
[sensor]
uuid=xxxxxxxx-xxxx-xxxx-xxxx-xxxxxxxxxxxx
upload_dir=/data/upload
process_dir=/data/process
Teacup configuration variables
[teacup]
interface=eth0, eth1, eth2
pcap_dir=/data/pcap
pcap_size=2 GB
server=192.168.0.1
Check for update every 15 minutes. (Default is 15 minutes if this field is not set)
update_timeout=900
Check for new files to upload every 5 minutes. (Default is 5 minutes if this field is not set)
upload_timeout=300

The command server 102 receives, from each of the sensor computers, metadata about the packet capture filters and data packets that are captured using the packet capture filters that are turned on at each of the sensor computers. The metadata may include, for example, for each packet capture filter, a number of data packets captured by the packet capture filter. Using the metadata, the command server 102 may instruct the respective sensor computer to turn off a packet capture filter that is deemed redundant to other packet capture filters that are turned on at the sensor computer or that is not capturing data packets because none or few of the data packets match the packet capture filter. If a particular packet capture filter is associated with metadata indicating that it is successfully capturing packets of interest at another sensor computer, the command server 102 may instruct the sensor computer to turn on the packet capture filter if the packet capture filter is already stored at the sensor computer.

A packet capture filter may be turned on/off for a number of reasons that are determined external to the Packet Capture Collection Tasking System including:

Network filters may be applied when observed malicious traffic is detected via network signatures or heuristics.
  May identify new IPs from which malicious traffic originates
  May identify domains resolving to new IPs.
Network filters may be applied when malicious actor owned infrastructure transitions to new IPs
Network filters may be turned off when heuristics identify a network filter that no longer collects malicious activity:
  An IP is no longer owned by a malicious actor
  A domain no longer resolves to an IP
Network filters may be turned off when malware command & control no longer matches the network filter.

Network 104 comprises one or more local networks, wide area networks, and/or internetworks and may comprise the public internet in whole or in part. In an embodiment, the compromised computer 108 hosts or executes malware that was previously obtained from or installed by an attacker computer (not depicted) that may be any computer that is ultimately used to initiate an attack, or the distribution of bots, other malware or viruses, and may be located within the same geographic region as other elements of FIG. 1 or in a different region. The compromised computer 108 may be coupled to network 104 indirectly through a firewall that is typically co-located with the compromised computer. The compromised computer 108 may host a browser. The compromised computer 108 may be a server computer of an enterprise that services file requests or serves web pages to one or more users of the enterprise. Thus, compromised computer 108 may broadly represent two or more computers within an enterprise, one or more of which is compromised, and/or one or more of which accesses or uses the computer for another purpose.

In an embodiment, sensor computer 106 is deployed physically near or at least in the same LAN segment as the compromised computer 108 and logically behind the firewall positioned between the compromised computer 108 and the network 104. Sensor computer 106 is coupled to compromised computer 108, and/or the firewall, and configured as a network tap to enable the sensor computer 106 to receive and inspect all packets or other data communications that the compromised computer 108 sends or receives. For example, sensor computer 106 is configured to obtain copies of all packets arriving from network 104 and directed to the compromised computer 108 on any interface of the compromised computer, and originating from the attacker computer, a third-party website, or any other data source. Typically, the sensor computer 106 obtains packets from the compromised computer 108 in a transparent manner without affecting transit of the packets.

In an embodiment, as sensor computer 106 receives and inspects packets directed to the compromised computer 108, the sensor computer 106 creates and stores sensor data that describes aspects of the packets, attacks, or related metadata. In an embodiment, the sensor data is locally stored at the sensor computer 106 and periodically forwarded to data sink server 118; for example, the sensor computer 106 may serve as a local cache that is periodically flushed to the data sink server 118 for persistent storage in one of the databases.

According to various embodiments, rather than saving data about every packet inspected, the sensor computer 106 saves data describing only a subset, or portion, of the packets. To determine whether any one particular data packet is saved or used in the generation of metadata, one or more packet capture filters are used to analyze the packet. The sensor computer 106 obtains the packet capture filters from the command server 102 and saves them to a memory. In some embodiments, the sensor computer 106 turns the packet capture filters on or off in response to instructions received from the command server 102. Each data packet is compared to one or more conditions defined by the packet capture filter. If the data packet satisfies the conditions, a copy of the data packet is saved and can be used in the generation of metadata. Data packets that do not satisfy the conditions of at least one packet capture filter are not saved or used in the generation of metadata. The data packets are allowed to pass to the compromised computer 108.

The sensor computer 106 typically is used, owned and operated by an entity different than that of compromised computer 108; for example, the sensor computer may be owned or operated by a security organization or enterprise that also owns, operates or uses the command server 102.

Placement of sensor computers 106, 110, and 114 may be performed by identifying malicious activity at a central location and tracing the activity to a particular compromised computer, then contacting the owner of that computer and reaching an agreement to place a sensor computer 106, 110, or 114 coupled to that compromised computer 108, 112, or 116. For example, the owner could be paid a research fee to permit local inspection of traffic to or from the compromised computer. The identification may use a variety of techniques including following malicious traffic from an available computer toward other computers that are compromised without the knowledge of their owners or operators, seed programs, malware reverse-engineering, and so forth.

Functions of sensor computers 106 generally may include filtering on ports of interest such as remote desktop protocol; RTP; SSL; SFTP; FTP; and others; detecting when message output or packet output reaches a certain capacity; detecting session construction for sessions with other computers; and analysis of intervals of times of day when messages are sent or when certain ports are used in packets. In all these examples, passive monitoring of traffic on ports is performed, data is stored locally on the sensor computer 106 and then periodically data is sent in reports to the data sink server 118. The data also can be fingerprinted to create signatures of observed packet patterns. Data collection at sensor computers 106, 110, and 114 also may comprise collecting usernames or e-mail addresses from phishing emails that a particular user clicks through; the username can be used to more finely correlate a particular bad set of data with a particular user, rather than a particular machine.

For the purpose of illustrating a clear example, FIG. 1 shows three sensor computers 106, 110, and 114 each coupled to a single compromised computer 108, 112, and 116, respectively. However, in other embodiments, there may be any number of sensor computers deployed in geographically distributed locations and associated with many different compromised computers that are owned and operated by different parties. Thus, this disclosure specifically contemplates the deployment of a large, widespread, geographically distributed overlay network consisting of large numbers of sensor computers, all reporting data to and interoperating with one or more command servers 102 that manage and control the sensor computers, where each of the sensor computers is co-located with a different compromised computer in a different location. The compromised computers may be owned by, operated by, or used by completely different and unrelated companies, enterprises, institutions or other parties, and may have been compromised by any number of different attacker computers at different times. Additionally, or alternatively, two or more of the compromised computers may be at the same physical location or in the same general geographic region, such as a store, campus or territory, and coupled to a single sensor computer 106 or multiple different sensor computers.

The sensor computers 106, 110, and 114 send the captured data packets, or copies thereof, to the data sink server 118. The sensor computers 106 is configured with a particular file size of the aggregated captured data packets, or data interval, which, when reached by virtue of capturing data packets, triggers a process at the sensor computer 106 that results in the data packets being sent to the data sink server 118. When the data interval is reached, the sensor computer 106 is configured or programmed to stop recording the data packets to a current file in memory and to create a new file in the memory. Any subsequent captured data packets are saved to the new file. The sensor computer 106 compresses the current file, performs any other operations such as encrypting the current file, and sends the current file to the data sink server 118. The data sink server 118 is configured or programmed to store the data packets captured by the sensor computers 106, 110, and 114.

FIG. 2 illustrates an example of logical and functional elements of the sensor computer 106. In an embodiment, the sensor computer 106 comprises a processor 202 and a memory 204. The memory 204 stores one or more sets of computer-readable instructions that are executable by the processor 202 and that transform a general-purpose computer to a special purpose machine, namely the sensor computer 106. In some embodiments, the computer-readable code 204 comprises one or more instances of worker code 206, 208, and 210. Each instance of the worker code 206, 208, and 210 may collect, filter, and store data packets from different ports of interest of the compromised computer 108.

Packet capture code 212 is configured or programmed to receive the data packets sent by or to the compromised computer 108. The packet capture code 212, using stored filters 214, evaluates each data packets against the stored packet capture filters 214. The stored packet capture filters 214 are received from the command server 102. Syntax validation code 216 is configured or programmed to request and obtain the filters from the command server 102 and validate the obtained filters by determining that the syntax within the filter is valid.

The packet capture filters 214 may vary between the sensor computers such that sensor computer 106 may have a different set of filters than either of sensor computer 110 and sensor computer 114. Further, the number of packet capture filters 214 that are turned on at any given time may be limited to prevent performance degradation of the sensor computer 106.

Each of the filters 214 comprises data that may be contained within a data packet. If the data matches the data packet, the filter 214 causes the data packet to be stored in captured packets database 220 at the sensor computer 106. A packet capture filter may include an IP address of interest, a port of interest, traffic that is of interest, or other data packet features that are of interest. In some embodiments, the packet capture filters 214 may in the Berkeley Packet Filter (BPF) format.

Statistical analysis code 218 is configured or programmed to analyze the captured data packets stored in the captured packets database 218. The resulting analysis data may include a count of the number of data packets captured, a size of the captured data packets, the packet capture filters used to capture the packets, counts of the number of data packets captured by each of the packet capture filters 214, and the like. The statistical analysis code 218 may receive and respond to requests from the command server 102 for the analysis data. The statistical analysis code 218 may further respond to requests from the command server 102 or the data sink server 118 to send the captured data packets to the data sink server 118 before the data interval associated with the sensor computer is met. The command server 102 may use the analysis data to turn on or off packet capture filters, to identify additional packet capture filters to add to the packet capture filters 214, or to identify packet capture filters to remove from the sensor computer 106.

3.0 PROCESS OVERVIEW

Figure 3:
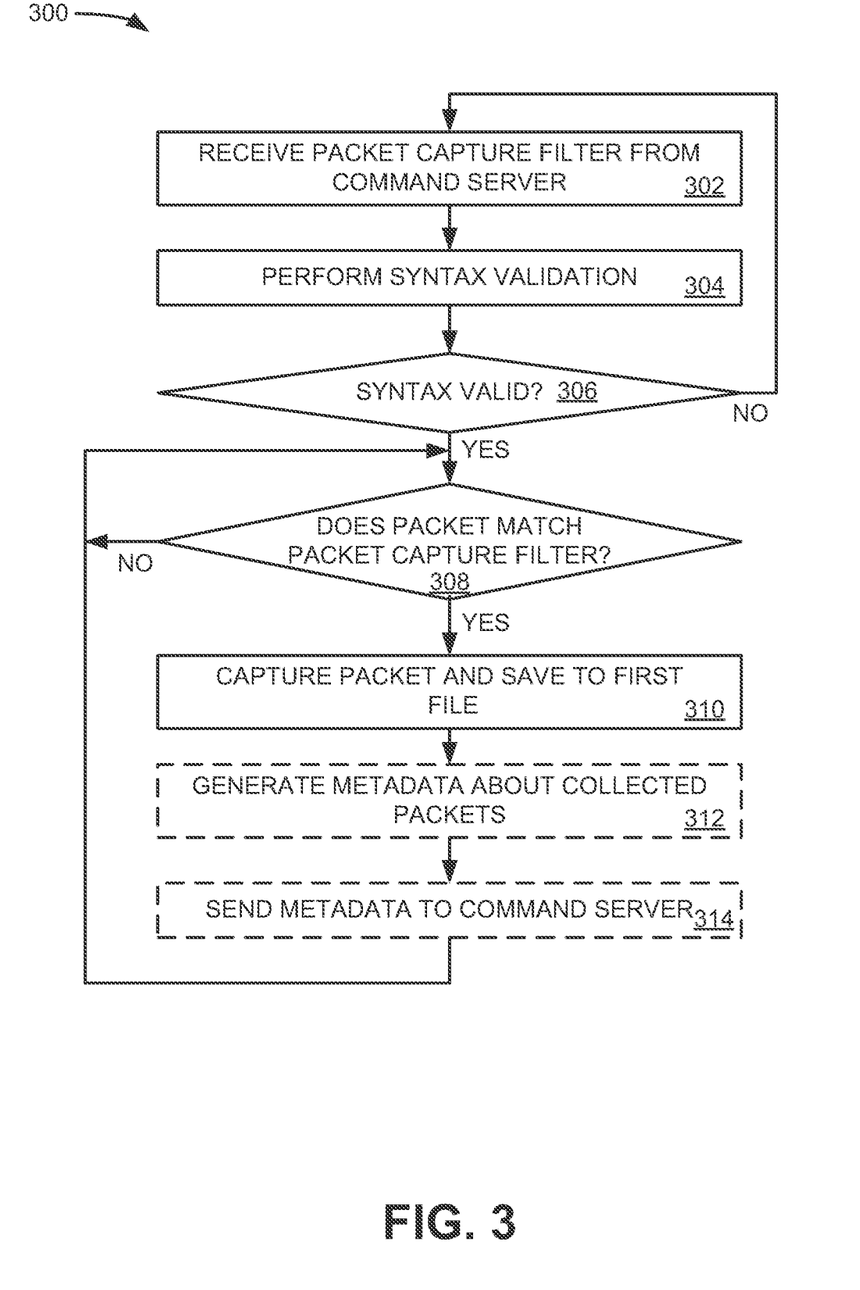
FIG. 3 illustrates a process of obtaining filters from the command server and filtering packets using the obtained filters, according to various embodiments.

FIG. 3 illustrates a process 300 of obtaining packet capture filters from the command server 102 and filtering data packets using the obtained filters, according to various embodiments. The process 300 further provides for the statistical analysis of the captured data packets. The process 300 is performed by the sensor computers 106, 110, and 114 and may be repeated for each filter stored in packet capture filters 214.

In an operation 302, the sensor computer receives a packet capture filter from the command server 102. The sensor computer may request data filters according to a time interval. The time interval may be determined according to a number of factors including, but not limited to, traffic to or from the compromised computer, an immediacy of identifying attacks or malware at the corresponding compromised computer, a capacity of the command server 102, a number of other sensor computers dispatched by the command server 102, and a history of malicious traffic at the compromised computer. In response to the request, the command server 102 may push a packet capture filter to the sensor computer or instruct the sensor computer to turn on a packet capture filter already stored in memory at the sensor computer.

In an operation 304, the sensor computer performs syntax validation of the received packet capture filter. The syntax validation comprises checking that the data in the packet capture filter is usable to identify data packets and/or to detect whether the packet capture filter was corrupted in transmission for the command server 102.

In an operation 306, the sensor computer determines whether the syntax in the packet capture filter is valid. If the syntax is invalid, the process 300 returns to the operation 302 and the packet capture filter may be requested again.

If the syntax is valid, the sensor computer initiates data packet capture in operation 308 by determining whether the data packet matches at least one of the packet capture filters that are turned on at the sensor computer. The data packets accessed via the sensor tap at the compromised computer are compared to the packet capture filter. The packet capture filter may indicate, for example, an IP address that is of interest because it is a known source of malware. If the data packet does not match the filter, the data packet is not stored and the operation 308 is repeated for a next data packet.

In an operation 310, if the data packet matches the packet capture filter, the sensor computer captures the matching data packet and saves it to a first file in the captured packets database 220. The captured packet is stored locally on the sensor computer until the first file is sent to the data sink server 118 as described in connection with FIG. 4.

In an optional operation 312, the sensor computer generates metadata describing the captured data packets stored in the first file. The metadata can be generated as part of the process 300 during data capture or as part of a process operating independently from the process 300. The metadata may include a size of the first data file, a number of data packets stored in the first data file, the filters that were matched by the data packets, and other metadata.

In an optional operation 314, the sensor computer sends the generated metadata of the operation 312 to the command server 102. The sensor computer may send the generated metadata according to an interval or schedule, or in response to a request for the metadata from the command server 102.

Figure 4:
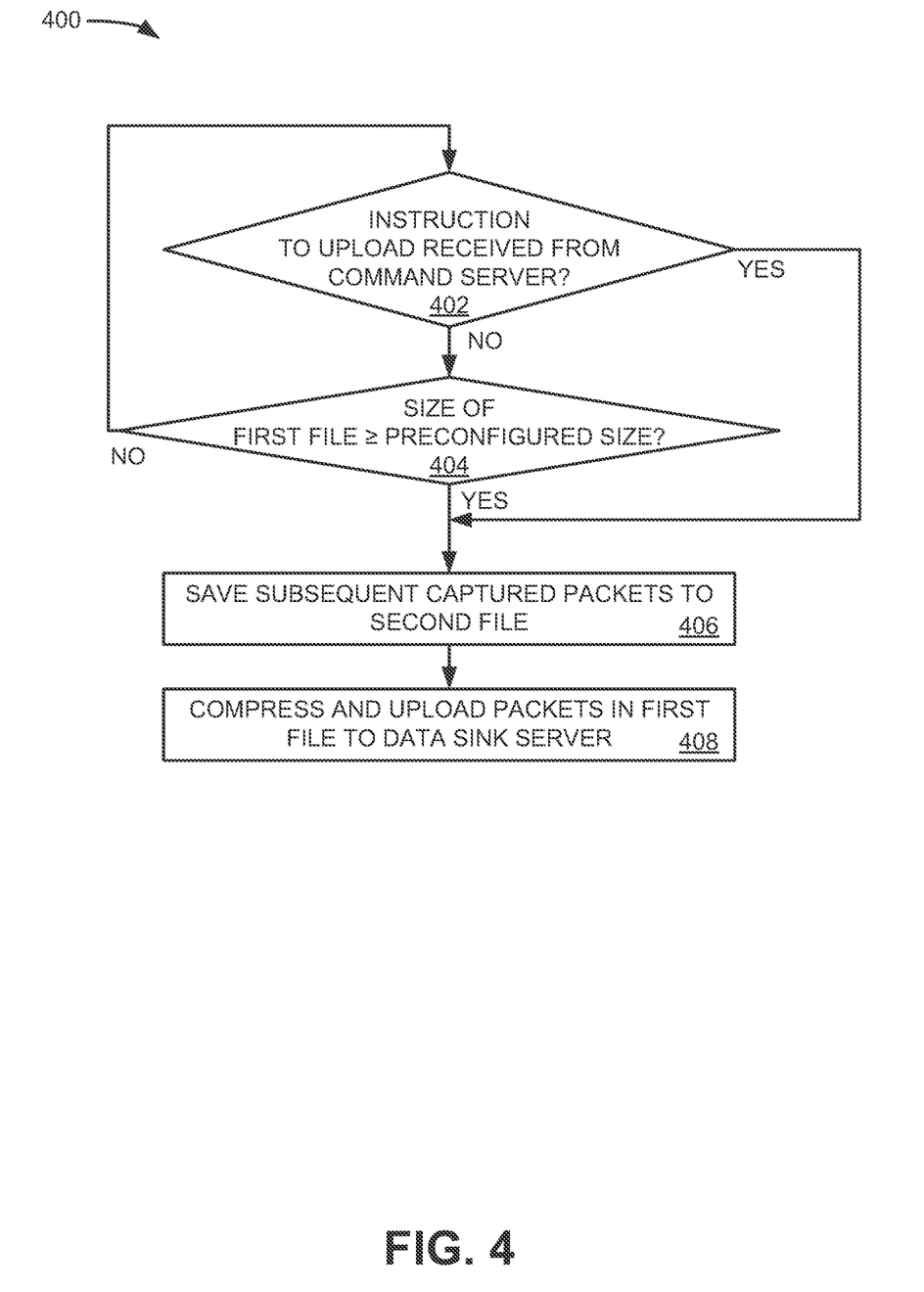
FIG. 4 illustrates a process of uploading captured packets to a data sink server, according to various embodiments.

FIG. 4 illustrates a process 400 of uploading captured packets to a data sink server 118, according to various embodiments. The process 400 is performed independently of the process 300 so that data packet capture can continue while earlier data packets are being made ready for transmission to the data sink server 118. The process 400 is performed by the sensor computers 106, 110, and 114.

In an operation 402, a determination is made as to whether an instruction to upload captured data packets has been received from the command server 102. The command server 102 may request an upload based on the generated metadata of the operations 312 and 314.

In an operation 404, if no request has been received, a determination is made as to whether a size of the first file of the operation 310 is greater than or equal to a preconfigured size. The preconfigured size can be determined based on bandwidth of a network connection between the sensor computer and the data sink server 118, a processing capacity of the sensor computer, an amount of memory at the sensor computer, an estimated time interval corresponding to the preconfigured size, or other factors.

If no instruction was received in operation 402 or if the size does not meet or exceed the preconfigured size in operation 404, the process 400 returns to operation 402. If an instruction was received or if the size of the first file meets or exceeds the preconfigured size, the process 400 proceeds to an operation 406. In the operation 406, a second file is created. Any subsequent captured data packets are then saved to the second file and are not saved to the first file. As such, no additional data packets are added to the first data file.

In an operation 410, the sensor computer compresses the captured data packets stored in the first data file. The sensor computer then sends the compressed data file to the data sink server 118. The data sink server, in turn, stores the captured data packets and makes them available to, for example, the command server 102.

4.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
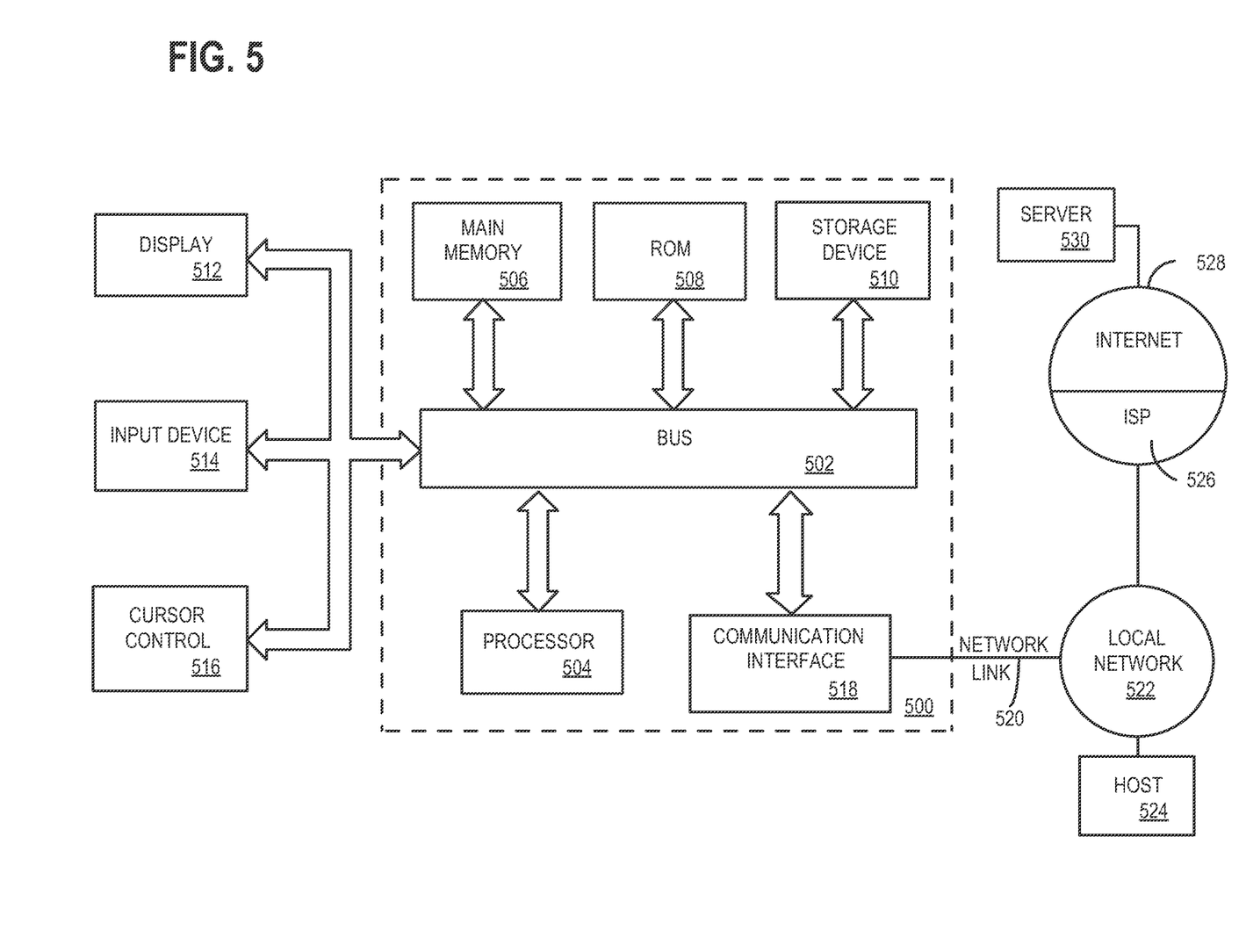
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services-digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system programmed to provide improved packet capture, the computer system comprising:
   a plurality of sensor computers each programmed to capture data packets directed to a different compromised computer from one or more attacker computers;
   a command server that is programmed to:
   identify a first packet capture filter of a plurality of packet capture filters for a first sensor computer of the plurality of sensor computers;
   transmit, via a communications network, the first packet capture filter to the first sensor computer of the plurality of sensor computers, and instruct the first sensor computer to capture a first set of data packets using the first packet capture filter;
   generate and transmit a first instruction to the first sensor computer instructing the first sensor computer to upload the first set of data packets that match the first packet capture filter to a data sink computer.

2. The computer system of claim 1, wherein the command server is further configured to:
   identify a second packet capture filter of the plurality of packet capture filters for a second sensor computer of the plurality of sensor computers;
   transmit, via the communications network, the second packet capture filter to the second sensor computer of the plurality of sensor computers, and instruct the second sensor computer to capture a second set of data packets using the second packet capture filter;
   generate and transmit a second instruction to the second sensor computer instructing the second sensor computer to upload the second set of data packets that match the second packet capture filter to the data sink computer.

3. The computer system of claim 2, wherein: the first sensor computer and a first compromised computer both are located on a first same segment of a first local area network; the second sensor computer and a second compromised computer both are located on a second same segment of a second local area network; the first local area network is different from the second local area network; and the command server is not in the first local area network or the second local area network.

4. The computer system of claim 2, wherein the data sink computer is programmed to receive and store, from the first sensor computer and the second sensor computer, the first set of data packets and the second set of data packets.

5. The computer system of claim 2, wherein the command server is further configured to generate a configuration file for the plurality of sensor computers;
   wherein the configuration file includes a data interval indicating a maximum size of the first set of data packets or the second set of data packets.

6. The computer system of claim 2, wherein the command server is further configured to generate configuration files for the plurality of sensor computers;
- wherein a first configuration file of the configuration files includes a time interval indicating an interval to instruct the command server to send the first packet capture filter to the first sensor computer;
- wherein a second configuration file of the configuration files includes a time interval indicating an interval to instruct the command server to send and the second packet capture filter to the second sensor computer.

7. The computer system of claim 2, wherein the first sensor computer of the plurality of sensor computers is programmed to generate metadata about the first set of data packets and send the metadata to the command server.

8. The computer system of claim 6, wherein the first packet capture filter defines a plurality of first conditions;
- wherein each data packet in the first set satisfies at least one of the plurality of first conditions;
- wherein the second packet capture filter defines a plurality of second conditions;
- wherein each data packet in the second set satisfies at least one of the plurality of second conditions.

9. The computer system of claim 2, wherein the command server is programmed to perform a syntax validation of the first packet capture filter and the second packet capture filter;
- wherein the command server is programmed to instruct the first sensor computer to terminate packet capture using the first packet capture filter.

10. The computer system of claim 1, wherein the first sensor computer is programmed to simultaneously capture the first set of data packets and a third set of data packets.

11. A computer system for improved packet capture in a networked environment, the computer system comprising:
- a sensor computer in electronic communication with a command server and coupled to a compromised computer, the sensor computer programmed to receive, via a communications network, a first packet capture filter, which defines a plurality of conditions, transmitted to the sensor computer and an instruction to capture data packets using the first packet capture filter, and to capture, using the first packet capture filter received from the command server, a set of data packets communicated by the compromised computer coupled to the sensor computer, wherein each data packets, in the set of data packets, matches at least one of the plurality of conditions defined in the first packet capture filter.

12. The computer system of claim 11, wherein the sensor computer is further configured to upload the set of data packets that match the first packet capture filter to a data sink computer upon receiving an instruction to do so from the command server.

13. The computer system of claim 11, wherein the sensor computer is further programmed to periodically upload the set of data packets to a data sink computer.

14. The computer system of claim 11, wherein the sensor computer is programmed to generate metadata about the set of data packets during capture of the set of data packets.

15. The computer system of claim 11, wherein the sensor computer is programmed to perform syntax validation of the first packet capture filter.

16. The computer system of claim 12, wherein the sensor computer is programmed to compress the set of data packets prior to uploading the set of data packets to the data sink computer.

17. The computer system of claim 11, wherein the sensor computer comprises a plurality of interfaces programmed to capture the set of data packets.

18. The computer system of claim 11, wherein the sensor computer is programmed to determine that a time interval has elapsed and, in response, to retrieve a third packet capture filter from the command server.

19. The computer system of claim 12, wherein the sensor computer is programmed to determine that a data interval has elapsed and, in response, to upload the set of data packets to the data sink computer.

20. The computer system of claim 19, wherein the sensor computer is programmed to adjust the data interval according to instructions received from the command server.

* * * * *